United States Patent Office 2,955,090
Patented Oct. 4, 1960

2,955,090
PROCESS FOR PREPARING A SUPPORTED NICKEL HYDROGENATION CATALYST

Sydney H. Richards, Pittsburgh, Pa., assignor to W. R. Grace & Co., New York, N.Y., a corporation of Connecticut No Drawing. Filed Feb. 4, 1959, Ser. No. 791,048

5 Claims. (Cl. 252—455)

This invention relates to a process for preparing a nickel catalyst, and more particularly to a supported nickel catalyst which is active in vapor phase hydrogenation reactions.

The number of patents demonstrating the catalytic reduction or hydrogenation of unsaturated organic compounds in the presence of metallic catalysts and hydrogen is legion. Catalysts used in such processes may be considered to function in the sense of causing a saturation of the free bonds by the active hydrogen atoms. In the process, the charging stock, together with sufficient hydrogen, is passed into a suitable reactor containing the catalyst where, at the desired temperature and pressures, the reaction takes place. Nickel may be classed as a "violent" hydrogenation catalyst in that it hydrogenates to complete saturation and for this reason it has gained a premier position in such reactions.

Processes for preparing nickel hydrogenation catalysts vary considerably. Generally, however, all processes have in common the step of washing the catalyst composite to remove soluble impurities before the catalyst can be activated and put to use. If a catalyst base is immersed in a solution of a simple nickel salt, such as the nitrate, chloride or sulfate, the base will adsorb the solution until its pores are filled and there the adsorption will cease. When the excess impregnating solution is drained off and the impregnated base is washed with water, the nickel salt is readily extracted from the base. Quite often, additional salt solution is added to the impregnating mixture to compensate for loss of nickel during the washing step in order to obtain the desired concentration of nickel in the final catalyst. Since many hydrogenation catalysts contain upwards of 35% nickel, such practices lead to an unnecessary loss of nickel. Accordingly, a process which would prevent loss of nickel during the washing step would have tremendous commercial significance.

The present invention provides a process whereby such objective may be accomplished. Not only is loss of nickel curtailed during the purification step, but the process also enables preparation of a catalyst having a low nickel content compared to established commercial catalysts and still have the desired hydrogenative activity. The process comprises impregnating a silica-alumina hydrocarbon cracking base with an aqueous solution consisting of ammonia and a nickel salt and subjecting the base in admixture with said solution to a temperature and for a time sufficient to fix the nickel on said base in water-insoluble form. The impregnated base is then washed and dried, and the nickel compound is thereafter reduced to metallic nickel. Such procedure yields a final catalyst having 10–15% nickel, which concentration of nickel is considerably less than established catalysts while performing equally as well in hydrogenation reactions.

The nickel is deposited on the base material in such manner that it is not removed by purification with water prior to the reduction step. Such deposition is described as "fixed" nickel, and the terms "fix" and "fixed" as used in describing the invention refers to the nickel which is associated with the base in such condition that it will not be extracted from the base by washing the composite with water. Such fixation is accomplished by heating the base in admixture with an aqueous solution consisting of ammonia and an appropriate nickel salt at the boiling point of the solution for several hours. The time of heating and the concentration of the reagents employed are dependent upon the concentration of nickel desired in the final catalyst. While the phenomenon of fixation is not understood, suffice it to say that it is believed that nickel is associated with the base in a more intimate manner both physically and chemically than by simple surface deposition obtained by ordinary impregnation techniques.

The base consists of a suitable hydrocarbon cracking composite such as silica-alumina, silica-magnesia, silica-alumina-magnesia and the like, and may be prepared in any manner well known in the art. A preferred base is a synthetic silica-alumina cracking catalyst containing about 10–40% alumina and the balance silica. Such a base may be prepared by acidifying an alkali metal silicate, such as sodium silicate, with a suitable acid and agitating the mixture to form a slurry of silica hydrogel. This slurry is thoroughly mixed with an amount of aluminum sulfate solution to provide the desired alumina content in the final cracking component. To the aluminum sulfate-silica hydrogel mixture is then added a basic compound to precipitate alumina and the resulting composite is filtered and processed according to conventional methods. The usual procedures are to dry the filtered mass, wash and re-dry. The resulting base may be shaped into microspheres by spray-drying a slurry of the silica-alumina composite, or it may be dried to form granules which may be used as such, or ground and formed into pellets with a suitable binding agent.

The base has a cracking thermal activity in the range between 50 to 60 distillate-plus-loss (D+L). This activity is measured by the following method. A sample of fresh pelleted catalyst is deactivated by treating it in a battery of three muffle furnaces at temperatures of 500° F., 1050° F., and 1550° F. The sample is moved from the low temperature to the next higher temperature muffle, remaining in each for three hours. 200 ml. of the thus-deactivated catalyst are placed in a reactor and maintained at a temperature of 850° F. During a period of 2 hours, 238.2 ml. of virgin East Texas gas oil is passed through the hot catalyst and the cracked products recovered and separated. The fraction which distills below 400° F., as well as gas and loss, is determined and designated as the distillate-plus-loss.

The influence which such cracking activity has in preventing loss of nickel during the washing process is not clearly understood. However, it will be shown hereinafter that a catalyst base which has had its cracking activity lessened or modified does not retain nickel to the same degree as an unmodified component. The concentration of nickel on the modified base was approximately one-half of that present in the catalyst prepared on the unmodified base. It is fair to assume therefore, that such a base has an influence in fixing the nickel in water-insoluble form.

The silica-alumina base as described above may be spray dried to form microspheres and the spheroids may be mixed with a suitable binding agent and the mixture pelleted to form cylinders of a desired size. The pellets are then placed in a vessel containing the impregnating solution which consists of aqua ammonia and a dissolved nickel salt. When nickel chloride is selected as the appropriate salt, the concentration of ammonia is such as to correspond to at least two moles of $NH_3$ per mole of $NiCl_2$. This solution containing the base pellets is then heated to its boiling point for a prolonged period to fix the nickel in water-insoluble form.

Following the impregnation period, the pellets are drained, washed with boiling water for about ½ hour and then with flowing water at room temperature for about 8 hours. Thereafter, the washed pellets are dried, and then reduced in a suitable manner. A hydrogenation catalyst thus prepared contains between 10–15% nickel in reduced form.

The following examples illustrate preparation of a hydrogenation catalyst according to this invention.

EXAMPLE I

A base having a cracking activity of 58.3 D+L was prepared by spray drying a silica-alumina composite and subsequently compressing the resulting microspheres into 3/16" x 3/16" pellets. An impregnating solution was prepared by dissolving 200 g. of solid $NiCl_2.H_2O$ in 340 ml. of 28% aqua ammonia. The pellets were admixed with the impregnating solution and the mixture heated at its boiling point for 16 hours. After this period, the impregnated pellets were washed with boiling water for 30 minutes and then continuously with water at room temperature. The washed pellets were dried for 16 hours at 230° F. and thereafter reduced with hydrogen for a period of 4 hours at 650° F. Analysis of the reduced catalyst showed a nickel content of 11.4%.

EXAMPLE II

Two preparations were made to determine whether the quantity of ammonia used in Example I could be reduced without reducing the nickel content of the catalyst. The quantities of $NiCl_2.6H_2O$ and base were the same but the ammonia usage was reduced to one-half and one-quarter of that used in preparing the catalyst of Example I. The nickel content of the two catalysts was 14.8% and 12.2% respectively.

The following Examples III and IV are presented to show preparation of catalysts on a modified base and the influence such modification has on the retention or fixing of nickel on said base.

EXAMPLE III 300 g. of silica-alumina granules were modified to a cracking activity of 18.5 D+L. The modified pellets were then immersed in a concentrated solution of nickel chloride hexammine (with dissolved hexammine in suspension) for a period of 120 hours at room temperature. The mixture was then treated for 24 hours at 190° F. The supernatant solution was then poured off and the impregnated pellets were washed until nickel was absent in the wash water. The catalyst was dried and reduced with hydrogen for 6 hours at 650° F. The reduced catalyst analyzed 1.3% nickel, which indicates that considerable nickel was lost during the water-washing step which would render it useless in hydrogenation reactions.

EXAMPLE IV 400 ml. of solution containing 120 g. $NiCl_2.6H_2O$ was heated at its boiling point for 2 hours with 300 g. of silica-alumina pellets which were modified to a cracking activity of 21.0 D+L. Thereafter 300 ml. of 28% $NH_3$ solution was added and the combined solutions boiled for 16 hours. The excess solution was then drained and the impregnated pellets were washed repeatedly with hot water until no reaction was obtained with dimethyl glyoxime. The pellets were dried and analyzed for nickel content. The results showed that the dried catalyst contained 6.4% nickel, which indicates that such concentration is insufficient for satisfacory performance of the catalyst in hydrogenation processes.

The catalyst prepared according to Example I (hereinafter referred to as "catalyst I") consisted of an unmodified silica-alumina hydrocarbon cracking base which had nickel affixed thereto by the prolonged heat-impregnation technique. It contained 11.4% nickel as compared to the nickel contents of 1.3% and 6.4% of the catalysts prepared according to Example III and IV respectively. The techniques of impregnation were substantially the same in each case, the only difference being in the use of modified bases in Examples III and IV versus the unmodified base used to prepare catalyst I.

EXAMPLE V

Catalyst I was tested by hydrogenating a hydrocarbon mixture consisting of 84% methylcyclopentane and 16% benzene under the following conditions:

| | |
|---|---|
| Temperature _____° C__ | 150 |
| Pressure _____p.s.i.g__ | 150 |
| Liquid hourly space velocity _____ | 1.0 |
| $H_2$/hydrocarbon ratio _____ | 6.0 |

The test was carried out for 3 one-hour periods. Analysis of the liquid products following the test periods showed that all benzene had been hydrogenated to cyclohexane or similar products.

Two commercial catalysts were tested under the same set of conditions as shown in Example V and compared with catalyst I for hydrogenation performance. The results of the tests are shown in the following table:

Table

| Catalyst | Ni Content, Percent |
|---|---|
| Commercial Catalyst X | 54.0 |
| Commercial Catalyst Y | 40.0 |
| Catalyst I | 11.4 |

PERCENT BENZENE IN PRODUCT

| 2nd hourly period | 3rd hourly period |
|---|---|
| 0 | 0 |
| 0 | 0 |
| 0 | 0 |

It can be readily seen that catalyst I performed equally as well as two commercial catalysts having a nickel content approximately four times higher than the catalyst prepared according to the process herein described. This fact alone has tremendous economic significance in commercial hydrogenation catalyst preparation.

I claim:

1. A process for preparing a supported nickel catalyst suitable for use in vapor phase hydrogenation reactions which comprises subjecting a silica-alumina hydrocarbon cracking base containing 10–40% alumina and admixed in an aqueous solution consisting of ammonia and a nickel salt to heat treatment at its boiling point for a time sufficient to impregnate and fix the nickel on said base in water-insoluble form, washing and drying the thus-impregnated base, and reducing the adsorbed nickel compound.

2. A process for preparing a supported nickel catalyst containing 10–15% nickel suitable for use in vapor phase hydrogenation reactions which comprises admixing a silica-alumina hydrocarbon cracking base containing 10–40% alumina with an aqueous solution consisting of ammonia and nickel chloride, said solution containing at least two moles of $NH_3$ for each mole of $NiCl_2$, heating the resulting mixture at its boiling point for a time sufficient to impregnate and fix the nickel on said base in water-insoluble form, washing the impregnated base, drying the washed impregnated base, and reducing the adsorbed nickel compound.

3. A process for preparing a supported catalyst containing about 10–15% nickel suitable for use in vapor phase hydrogenation reactions which comprises admixing a hydrocarbon cracking base consisting of about 13% alumina and 87% silica with an aqueous solution consisting of ammonia and nickel chloride, said solution containing at least two moles of $NH_3$ for each mole of $NiCl_2$, heating the resulting admixture at its boiling point for a time sufficient to impregnate and fix the nickel on said base in water-insoluble form, washing the impregnated base, drying the washed impregnated base, and reducing the adsorbed nickel compound in an atmosphere of hydrogen.

4. A process according to claim 3 wherein the base has a catalytic cracking activity of about 50.

5. A process for preparing a supported catalyst containing about 10–15% nickel suitable for use in vapor phase hydrogenation reactions which comprises heating a silica-alumina hydrocarbon cracking base containing 10–40% alumina in admixture with an aqueous solution consisting of ammonia and nickel chloride at its boiling point for a period of about 16 hours and thereby impregnating and fixing the nickel in the base in water-insoluble form, said solution containing at least two moles of $NH_3$ for each mole of $NiCl_2$ washing the base first with boiling water and thereafter washing with water at room temperature, drying the washed impregnated base at about 230° F., and reducing the nickel compound on said base in an atmosphere of hydrogen at a temperature of about 650° F.

References Cited in the file of this patent

UNITED STATES PATENTS

| | | |
|---|---|---|
| 2,519,099 | Bailey | Aug. 15, 1950 |
| 2,589,189 | Ciapetta | Mar. 11, 1952 |
| 2,888,501 | Folkins | May 26, 1959 |